United States Patent [19]

Ćuk et al.

[11] 4,184,197
[45] Jan. 15, 1980

[54] DC-TO-DC SWITCHING CONVERTER

[75] Inventors: Slobodan M. Ćuk, Huntington Beach; Robert D. Middlebrook, Pasadena, both of Calif.

[73] Assignee: California Institute of Technology, Pasadena, Calif.

[21] Appl. No.: 837,532

[22] Filed: Sep. 28, 1977

[51] Int. Cl.² .......................................... H02M 3/335
[52] U.S. Cl. ........................................ 363/16; 363/40
[58] Field of Search ................... 336/184; 363/15, 16, 363/20, 21, 40, 106, 110, 124, 131, 140

[56] References Cited

U.S. PATENT DOCUMENTS

| | | | |
|---|---|---|---|
| 3,381,202 | 4/1968 | Loucks et al. | 363/21 |
| 4,024,452 | 5/1977 | Seidel | 363/15 |

*Primary Examiner*—William M. Shoop

*Attorney, Agent, or Firm*—Freilich, Hornbaker, Wasserman, Rosen & Fernandez

[57] ABSTRACT

A dc-to-dc converter having nonpulsating input and output current uses two inductances, one in series with the input source, the other in series with the output load. An electrical energy transferring device with storage, namely storage capacitance, is used with suitable switching means between the inductances to DC level conversion. For isolation between the source and load, the capacitance may be divided into two capacitors coupled by a transformer, and for reducing ripple, the inductances may be coupled. With proper design of the coupling between the inductances, the current ripple can be reduced to zero at either the input or the output, or the reduction achievable in that way may be divided between the input and output.

33 Claims, 28 Drawing Figures

TRANSISTOR ON
INTERVAL $T_sD$

TRANSISTOR OFF
INTERVAL $T_sD' \equiv T_s(1-D)$ $i_1$ and $i_2$ nonpulsating
currents with ripple

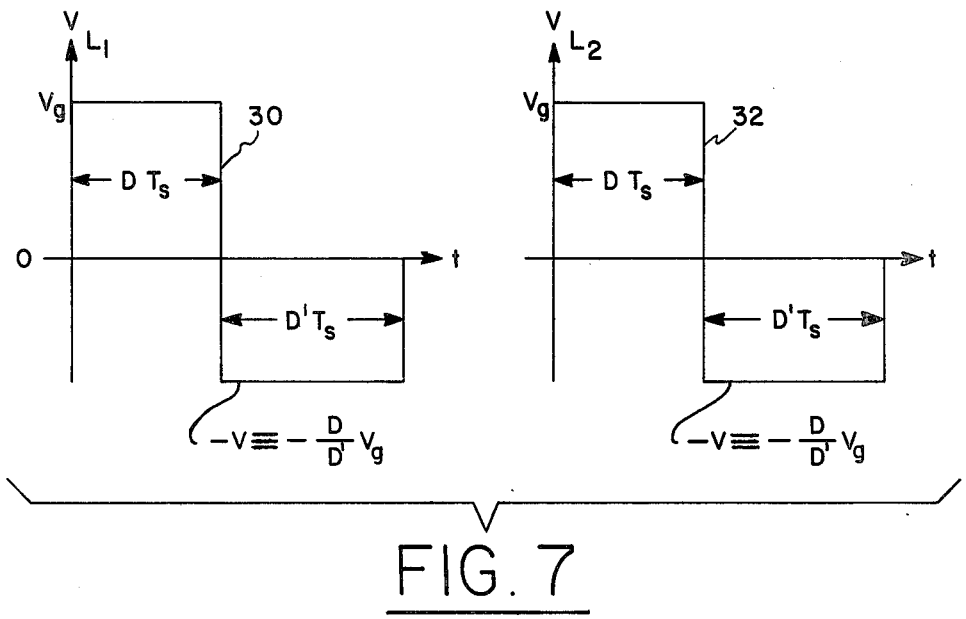
FIG. 7
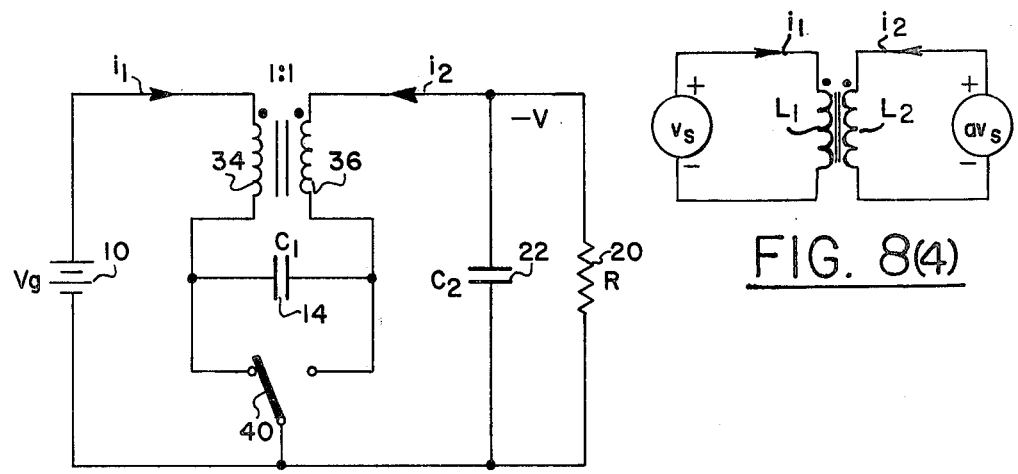
$$\frac{V}{V_g} = \frac{D}{D'}$$
FIG. 8
FIG. 8(A)

DC-TO-DC SWITCHING CONVERTER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to dc-to-dc converters and more particularly to a switching converter having nonpulsating input and output current.

Several of the prior-art dc-to-dc converters are described here and some of their deficiencies are discussed. Later, after the present invention disclosed herein has been described, comparison of the invention with the prior-art converters will reveal the superior characteristics of the invention.

All of the three configurations discussed here (conventional buck-boost, cascade connected boost and buck, and double-ended, push-pull converters) have the general DC conversion property, that is increase or decrease of both DC voltage and current. The same property is present in this invention as well, but with nonpulsating input and output current, and if desired isolation between the input and output can be obtained. The input or output current ripple may be reduced to zero.

OBJECTS AND SUMMARY OF THE INVENTION

An object of this invention is to provide a dc-to-dc converter having a maximum performance (high efficiency and low electromagnetic interference) for the minimum number and size of parts.

A further object is to provide a dc-to-dc converter having nonpulsating input and output current.

Another object is to provide a dc-to-dc converter with input or output current ripple reduced to zero.

Still another object is to provide a dc-to-dc converter which satisfies any of the foregoing objects with isolation between the current source and the load.

Yet another object is to provide a dc-to-dc converter which satisfies any of the foregoing objects with or without isolation and with an extended range of step-up or step-down of the input DC voltage.

These and other objects of the invention are achieved in a dc-to-dc converter with two inductances, a first one in series with the input source and a second one in series with the load, and energy transferring means having storage capabilities connected between the two inductances. The energy transferring means is comprised of storage capacitance in series with the two inductances and switching means for alternately connecting the junction between the first inductance and the storage capacitance to ground for the source, and connecting the junction between the storage capacitance and the second inductance to ground for the load. In some applications, both the load and the source may be referenced to the same ground. In those applications where the load and the source may not be referenced to a common ground, isolation between the source and the load is provided by dividing the storage capacitance between two capacitors with transformer coupling between the capacitors. In either case, the two inductances may be windings of a transformer designed for no ripple in either the input current or the output current. For zero output current ripple, the transformer is designed for the condition $n = k$, and for zero input current ripple, the transformer is designed for the condition $h = 1/k$, where n is equal to the square root of the ratio of the self-inductances $L_{11}$ and $L_{22}$ of the input and output windings, respectively, and k is the coupling coefficient between the two windings. Alternatively, either of the two inductances may be a tapped inductor to form an autotransformer. In the input, the autotransformer provides an extended range of step-up of the input DC voltage, and in the output it provides an extended range of step-down of the input DC voltage.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 7 is a waveform diagram illustrating a voltage waveforms occurring on input and output inductors.

FIGS. 8(1), 8(2) and 8(3) are waveform diagrams illustrating the effects of inductive coupling design between input and output inductances in the present invention, and FIG. 8(4) is a generalized circuit diagram of this inductive coupling.

DESCRIPTION OF PRIOR ART CONVERTERS

Figure 1:
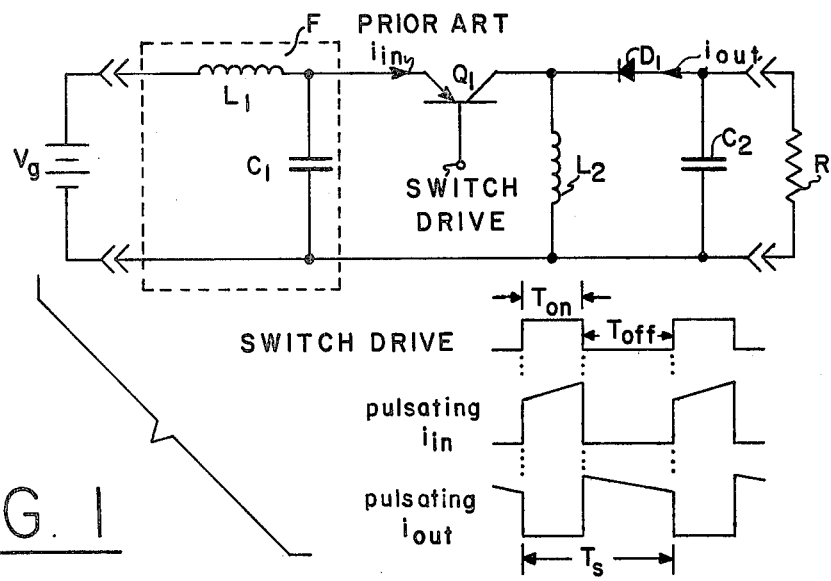
FIG. 1 is a schematic diagram of a conventional buck-boost converter.

A conventional buck-boost converter is shown in FIG. 1 together with the corresponding pulsating input and output current waveforms, $i_{in}$ and $i_{out}$. As seen in FIG. 1, the current drawn by this DC converter is not continuous and "clean" DC; rather it is pulsating, where the pulse amplitude in a higher current (and power) application may be very high. This invariably requires that an input filter F (usually a single section low-pass filter comprised of an inductance $L_1$ and capacitance $C_1$) be put in front to smooth out the substantial current pulse component at the switching frequency drawn from the line supply. In that way, electromagnetic interference (EMI) problems generated by the abrupt variation in energy flow (pulsating current) are reduced, and contamination of the environment by the undesired electromagnetic disturbances is alleviated. In operation, a transistor $Q_1$ is alternately turned on and off. When it is conducting, an inductance $L_2$ stores energy, and while it is off, the energy stored flows through a diode $D_1$ to a load R. A capacitance $C_2$ across the load smooths the output current to the load.

While the input filter F reduces EMI problems at the input, the output current $i_{out}$, as seen in FIG. 1, is still pulsating, thus requiring a large size of output capacitance $C_2$ to smooth out that pulsating current ripple. In addition, relatively complicated "floating" switch drive circuitry is required for the transistor in this converter since its emitter is not referenced to ground.

In summary, the important deficiencies of this prior art include the fact that both input and output currents are pulsating (with corresponding EMI problems), that larger size and weight are required, that complicated drive circuitry is required and, as demonstrated later, that significantly lower efficiency results.

Figure 2:
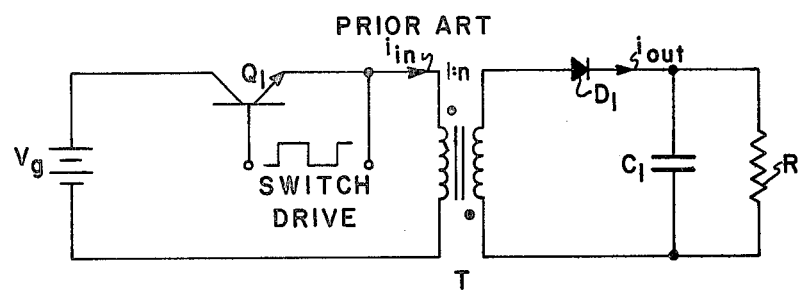
FIG. 2 is a schematic diagram of a conventional transformer-coupled buck-boost converter.

The converter of FIG. 1 can be easily updated to obtain a converter with a so-called isolation property that allows the unregulated source voltage ground to be isolated from the load ground. Such a modified transformer-coupled buck-boost converter is shown in FIG. 2, wherein corresponding elements are identified by like reference characters as in FIG. 1.

Note that the ideal DC voltage gain $(V/V_g)$ of the converter in FIG. 1 is given by:

$$V/V_g = D/D'; D' = 1 - D, \qquad (1)$$

where $D =$ duty ratio (ratio of the on-time to the switching period $T_s$), or $D = T_{on}/T_s$, and $D'$ is the complementary duty ratio, $T_{off}/T_s$. The corresponding gain of the converter in FIG. 2 is:

$$V/V_g = n(D/D'). \qquad (2)$$

Hence, an additional control over the step-up or step-down of the voltage can be achieved by the transformer turns ratio n.

Note also the reversal of the output voltage polarity in the converter of FIG. 1 since it is inherently inverting, while that of FIG. 2 can have either polarity depending on the direction of coupling of the transformer (dot sign), and corresponding direction of the diode $D_1$.

Figure 3:
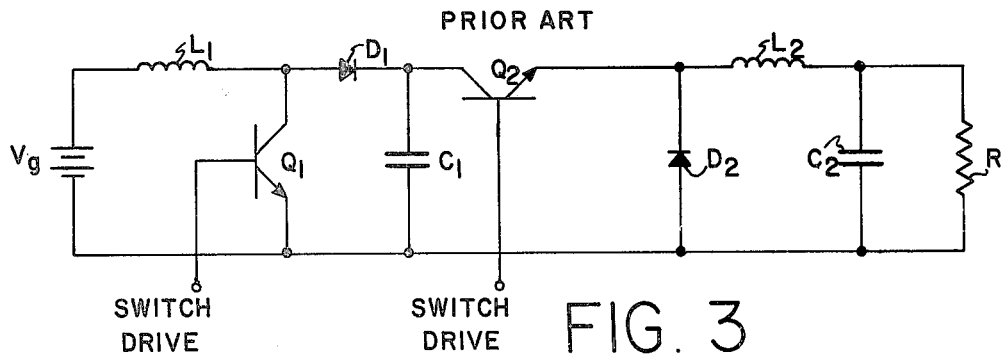
FIG. 3 is a schematic diagram of a conventional cascaded boost converter followed by a buck converter.

The same general DC conversion function of Equation (1) can be achieved by simply cascading the two basic converters, namely the boost (with $V/V_g = 1/D' = DC$ gain) and the buck (with $V/V_g = D = DC$ gain) resulting in the same overall DC gain as given by Equation (1). This suggested converter is shown in FIG. 3 wherein corresponding elements are identified by like reference numbers as in FIGS. 1 and 2, but with subscripts 1 and 2 for the two basic converters cascaded.

While this converter has some good properties (both input and output currents continuous, that is, nonpulsating) it has some additional deficiencies. It needs an additional transistor $Q_2$ and diode $D_2$ which cause added DC and switching losses and hence significantly degrade the efficiency of the converter, besides its increase of complexity and number of components. Also at least one of the switching transistors requires floating drive circuitry, hence need for two isolated drive circuits, which further complicates its drive. Also there is no possibility to introduce the isolation property into this converter by simple means, as was the case in the conventional buck-boost converter of FIG. 2.

Another commonly used variation of the conventional buck-boost converter which uses a push-pull arrangement of the two converters in FIG. 2 is shown in FIG. 4, where again corresponding elements are identified by like reference characters as in FIG. 2 but with subscripts 1 and 2 for the two basic converters working in parallel and a single output filter, L and C.

This typical push-pull type converter circuit generally requires many circuit components in addition to those shown to compensate for the inherently disadvantageous characteristics of the converter circuit. For example, the input impedance of the conventional push-pull converter tends to be capacitive causing large inrush currents when the circuit is initially energized. Also in this converter, peak transient voltages and currents occur owing to the conduction discontinuity when both switching transistors are biased nonconducting. Large capacity switching transistors and converter power transformer are required to deal with these peak transient currents and voltages. In addition, symmetry correction is frequently necessary to prevent the transformer from drifting into saturation owing to unequal parameter characteristics of the two switching transistors. This converter normally requires an input filter which still further increases its already high complexity.

Many of the disadvantages and the deficiencies outlined in these converters are overcome by the present invention and in several of its extensions as verified both theoretically and experimentally in the later comparison.

DESCRIPTION OF PREFERRED EMBODIMENTS

Figure 5:
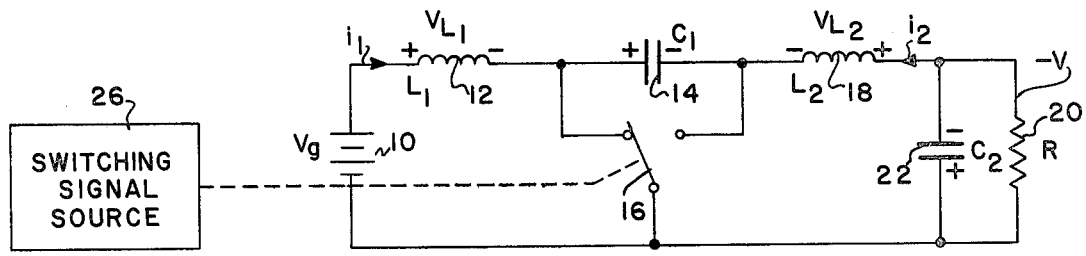
FIG. 5 is a schematic diagram of an embodiment of the invention illustrating and idealizing its switching means, FIGS. 5(1) and 5(2) illustrate configurations of the circuit of FIG. 5 with its switch to the left and to the right, respectively.
Figure 5:
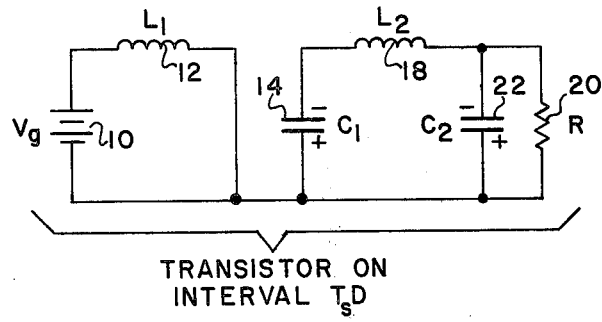
Figure 5:
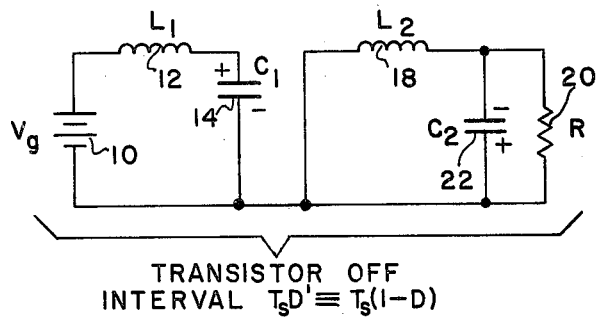

FIG. 5 is a schematic diagram of a preferred embodiment of the invention. A DC input voltage ($V_g$) source 10 has its positive terminal connected to an input inductance 12. The input inductance is connected to a storage capacitance 14. An idealized switch 16 is provided for alternately connecting the junction between the first inductance 12 and storage capacitance 14, and connecting the junction between the latter and a second inductance 18, to the common point between the source and the load. The second inductance 18 is connected in series with the load 20. Filter capacitance 22 is connected across the load.

FIG. 5(1) illustrates the circuit configuration with the switch to the left and FIG. 5(2) illustrates the circuit configuration with the switch to the right. Assume that the switch is initially to the right as in FIG. 5(2). Then, capacitance 14 charges up from the source 10 through inductance 12. When the switch 16 is thrown to the left, it connects to ground the positive side of capacitance 14 as shown in FIG. 5(1). As a result, capacitance 14 discharges through inductance 18 into the load 20 and charges capacitance 22. When the switch is then thrown back to the right, capacitance 14 again commences to charge up while inductance 18 supplies the load current. Thus it is evident that as the switch 16 is operated alternately to the left and to the right, the capacitance 14 and inductance 18 will supply current to the load. The capacitance 22 aids the inductance, thereby filtering the output current ripple.

Figure 6:
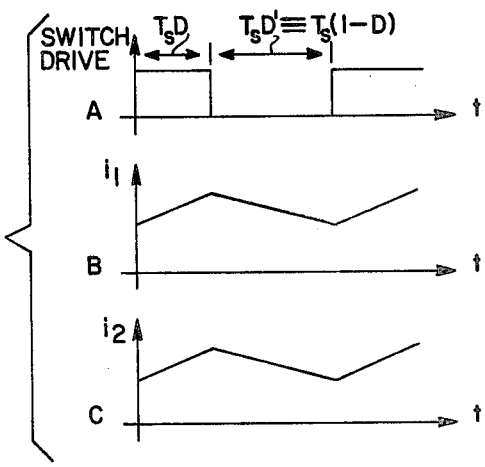
FIG. 6 is a waveform diagram illustrative of waveforms occurring in the circuit of FIG. 5.

FIG. 6 shows in waveform A an on-off switching signal from the switching source 26. Waveform B represents the input current $i_1$ from the source, and waveform C represents the output inductor current $i_2$. Both the input and output currents are seen to have a ripple, but neither is pulsating (periodically falling to zero), as in the prior art. (See FIG. 1.)

Figure 5A:
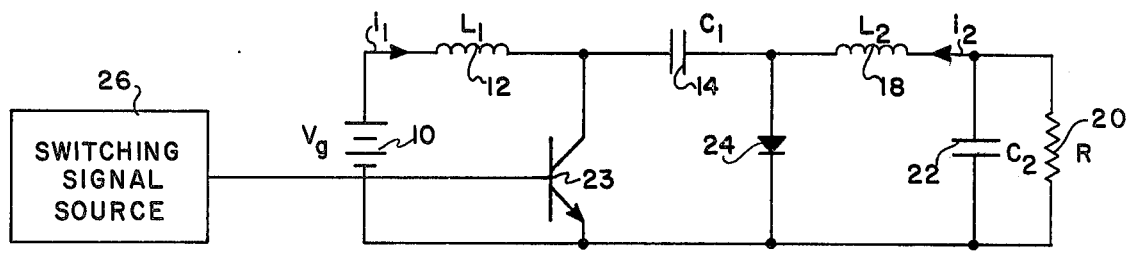
FIG. 5a shows the circuit of FIG. 5 with a bipolar transistor and diode used to implement the ideal switch.

FIG. 5a shows the circuit of FIG. 5 with the idealized switch 16 implemented by a transistor 23 and a diode 24. In operation, assume that the transistor is initially in its nonconductive state. Then capacitance 14 charges from the source 10 through the inductance since the diode 24 is forward-biased. At this time the collector of the transistor is positive with respect to its emitter so that when a switching pulse arrives to turn on the transistor, it becomes conductive. This has the effect of grounding the side of the capacitance that is connected to the transistor. The diode is thus back-biased, and the capacitance discharges through the inductance 18 into the load. When the switching pulse drops so that the transistor is cut off, the storage capacitance 14 again charges while the output inductance 18 supplies current to the load. Thus the transistor is driven by a train of pulses from a source 26 while the diode 24 responds as a complementary switch to the transistor being switched off and on.

From the foregoing it is evident that the capacitance 14 plays the role of an energy-transferring device. Presently used converters store energy in inductance in the form of a magnetic field during one interval and release the energy to the load during a subsequent interval. In the present invention, the energy is accumulated in capacitance in the form of an electric field and then transferred to a load. Owing to significantly higher energy density per unit volume (or weight) of capacitor storage compared to inductive storage, significant size reductions are possible.

The DC voltage gain of the invention can be determined from the following formula:

$$V/V_g = D/D' \quad (3)$$

where:
$V_g$ is the DC input voltage
D is the fractional ON-time of the transistor switch; and
D' is the fractional OFF-time of the transistor switch
The DC current gain may be determined from the formula:

$$I_2/I_1 = D'/D \quad (4)$$

where:
$I_1$ is the DC input current, and
$I_2$ is the DC output current
Thus, as seen from the polarity of output voltage in FIG. 5, the present invention is also an inherently-inverting converter as is the conventional converter of FIG. 1.

Figure 5B:
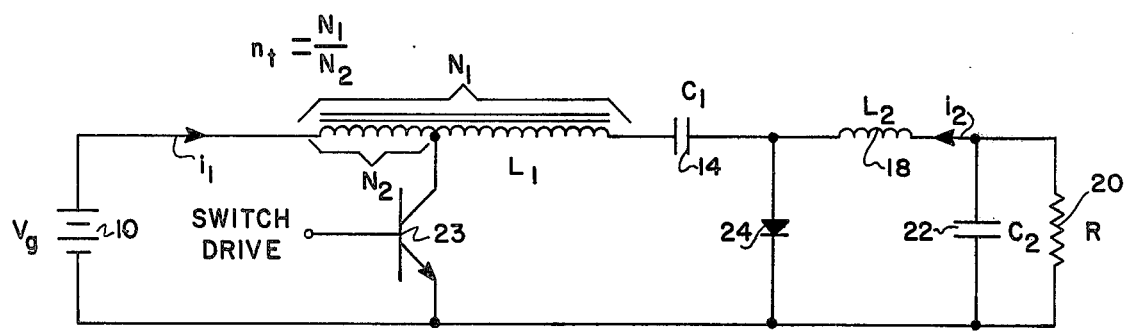
FIGS. 5b and 5c show variants of the circuit of FIG. 5.

Some simple modifications of the new converter that are also applicable to the conventional buck and boost converters can now easily be made. Namely by tapping the input inductor in the new converter of FIG. 5 (as shown in FIG. 5b ), an additional step-up of the input DC voltage dependent on the tap ratio $n_t$ may be achieved. Likewise, by tapping the output inductor in the converter of FIG. 5, as shown in FIG. 5c, an additional step down of the input DC voltage is provided through this autotransformer action.

Figure 5C:
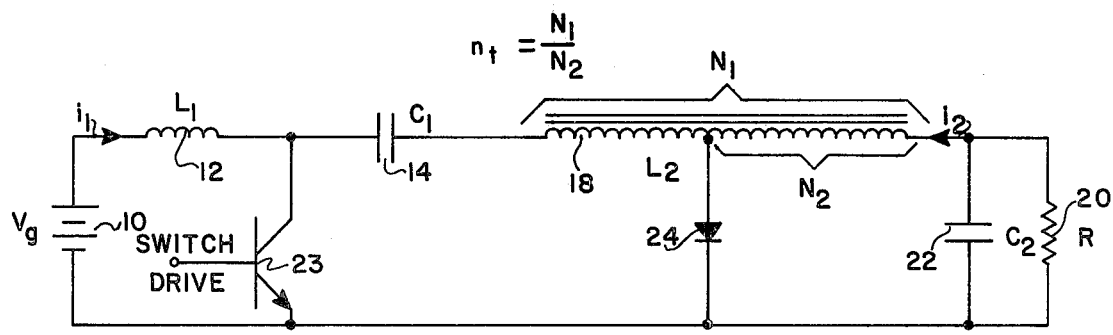

The overall ideal DC gains of the two converters in FIGS. 5b and 5c are then $$V/V_g = n_t(D/D') \text{ (tapped input inductor)} \quad (5)$$

$$V/V_g = (1/n_t)(D/D') \text{ (tapped output inductor)} \quad (6)$$

where the tap ratio $n_t$ is as defined in FIG. 5b or FIG. 5c. These two relatively straightforward modifications are useful when a large step-up, or step-down, ratio of the input voltage is required. The tap ratio $n_t$ can be chosen to be less than unity if desired.

Besides these relatively simple modifications, some rather crucial extensions can be made by utilizing unique possibilities of the new converter topology, as shown next.

Consider, for example, the voltage waveforms $V_{L1}$ and $V_{L2}$ on the two inductances 12 and 18 as defined in FIG. 5. They can easily be found by the fact that the voltage on capacitance 14 is essentially a DC voltage $V_{C1} = V_g/D'$. With the transistor turned on:

$$V_{L1} = V_g, V_{L2} = V_{C1} - V = (V_g/D') - (DV_g/D') = V_g \quad (7)$$

With the transistor turned off:

$$V_{L1} = V_g - (V_g/D') = -(D/D')V_g, V_{L2} = -V = -(D/D')V_g$$

The voltage waveforms $V_{L1}$ and $V_{L2}$ are then as shown in FIG. 7 which is a diagram illustrating these waveforms.

Figure 8:
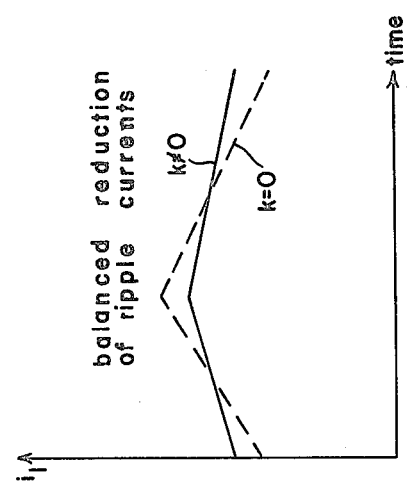
FIG. 8 is a circuit diagram illustrative of a second embodiment of the invention.
Figure 8:
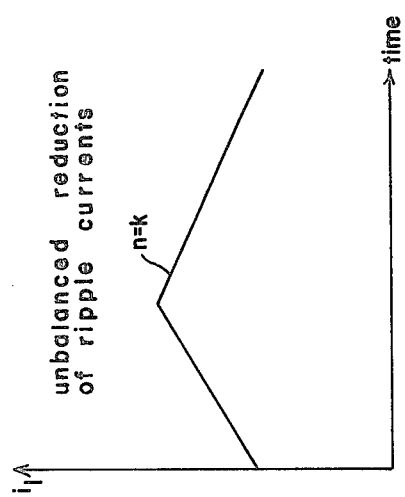
Figure 8:
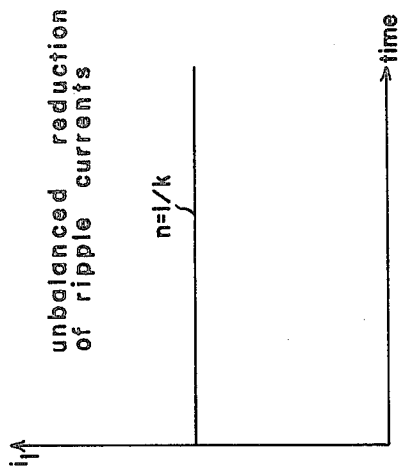
Figure 8:
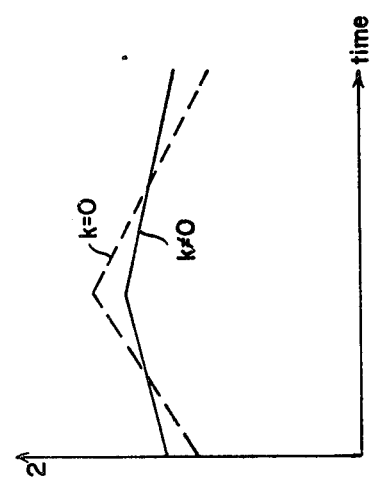
Figure 8:
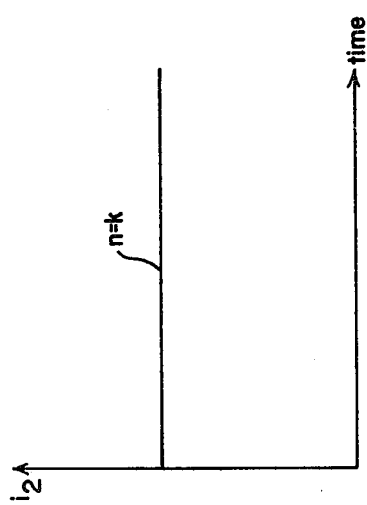
Figure 8:
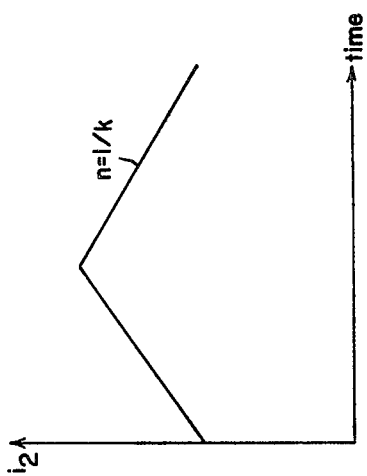

In FIG. 7, the waveform 30 is the waveform on inductance 12 and the waveform 32 is the waveform on inductance 18 when the converter shown in FIG. 5 is operating. From the waveforms shown in FIG. 7, it becomes clear that the two inductances can be coupled as in a transformer, without affecting the basic DC conversion property provided the transformer has a one-to-one turns ratio. This is easily achieved by choosing a transformer having the primary and secondary winding with the same number of turns and with the direction of coupling shown by dots in FIG. 8, which illustrates a variant of the invention wherein the inductances 14 and 18 are respectively the primary winding 34 and the secondary winding 36 of a one-to-one transformer. Other components of the circuit which serve the same function as the components on FIG. 1 are identified by the same reference numerals. A single-pole, double-throw switch 40 represents the functions of the diode and transistor in the circuit of FIG. 5. The switching converter shown in FIG. 8 is the only switching converter (besides the straightforward cascade-connected boost and buck converters shown in FIG. 3) in which transformer coupling of the input and output inductance is possible. In other two-inductance converters (buck or buck-boost with input filter), this cannot be achieved.

While the basic conversion property is not affected by this transformer coupling, and all of the advantages of the optimum topology switching converter of FIG. 5 are retained, several additional benefits are achieved in the variant of FIG. 8. One benefit is that either the input or the output current ripple can be reduced by an order of magnitude or more in comparison with their non-coupled counterparts. In fact, either input or output current ripple can be made zero. This has been verified both theoretically and experimentally. This allows further significant reduction in size and weight for the same ripple performance. A second benefit is that instead of two cores for two non-coupled inductors, a single core for the transformer may be used, thus further reducing the size, weight, and component count of the converter. Hence, the switching converter shown in FIG. 8 has the simplest possible structure (single 1:1 transformer, commutation capacitance 14, and switch 40), and yet it achieves the maximum performance (both input and output current are non-pulsating) in a topology which offers the smallest possible size and weight and highest efficiency.

Detailed analysis of the effect of this inductor coupling upon the current ripples shows that the ratio of the transformer primary and secondary leakage inductance plays the major role in the degree of reduction of the input and output current ripples. At one extreme, in the limiting case when primary leakage inductance becomes zero (for tightly coupled transformer) the output secondary current may become essentially DC with a zero switching ripple. At another extreme, when the two leakage inductances approach equality (usually for loosely coupled transformer), the reduction in the switching current ripple is equally divided between transformer primary and secondary, cutting approximately in half the current ripples in the original uncoupled converter. This balanced reduction represents, in a way, the "worst-case improvement" over the uncoupled configuration, since the unbalanced case (obtained by closely matching effective transformer turns ratio and coefficient of coupling) leads to an order of magnitude reduction in output current ripple, for example. Both of these effects (loose and tight coupling) have been experimentally verified and shown to agree with theoretical predictions. With proper design of the transformer, the current ripple can be reduced to zero (DC current) at either the input or the output. For the latter, $n=k$ and for the former $n=1/k$, where $n=\sqrt{L_{11}/L_{22}}$ and $L_{11}$ and $L_{22}$ are the respective primary and secondary selfinductances, and K is the coupling coefficient.

FIGS. 8(1), 8(2), and 8(3) illustrate in waveform diagrams the advantage of coupling the input and output inductances. Input and output currents, $i_1$ and $i_2$, are shown in each figure for three different conditions of inductive coupling. In FIG. 8(1) the condition of no inductive coupling ($k=0$) is first shown in dotted lines to illustrate the ripple in typical input and output currents. The solid lines in FIG. 8(1) then show the balanced reduction of ripple, the "worst-case improvement" referred to above, where $n-1$. By design of the inductive coupling for the condition $n \neq 1$, either the input or the output ripple may be reduced to zero. If n is set equal to k (the value of the coefficient k is always less than 1), the input and output current waveforms of FIG. 8(2) can be achieved with zero ripple in the output current for a particular value of k. SImilarly, by design of the inductive coupling for the condition $n=1/k$ the input and output current waveforms of FIG. 8(3) can be achieved with zero ripple in the input current for a particular value of k. The balanced condition (n=1) of FIG. 8(1) is thus clearly a compromise in reduction of ripple. Half of the reduction is achieved in the input current, and half in the output current. By unbalancing that condition in favor of the condition $n=1/k$, all of the reduction of ripple is achieved in the input current, $i_1$, as shown in FIG. 8(3). If n is increased further from that condition of zero input ripple or if the coefficient of coupling is further increased such that $n>1/k$ is satisfied, the input current will again have ripple, but with 180° phase shift from the ripple that would otherwise be present for the balanced condition. (The coefficient k is easily increased by decreasing the air gap of a cut core on which the inductors are wound.) By unbalancing the condition of FIG. 8(1) in the opposite direction in favor of the condition $n=k$, all of the reduction of ripple is achieved in the output current, $i_2$, as shown in FIG. 8(2). If the value of k is further increased from that condition of zero output ripple, the output current will again have ripple, but with 180° phase shift from the ripple that would otherwise be present for the balanced condition. This coupling technique may be used to equal advantage in other converters having two inductors, such as the prior art converter of FIG. 3.

FIG. 8(4) illustrates a generalization of this inductive coupling technique. The switching voltage source $v_s$ produces a nonpulsating input current $i_1$ across the primary inductance $L_1$ and a switching voltage source $av_s$ produces a nonpulsating output current $i_2$ across the secondary inductance $L_2$. It is possible to reduce the current ripple to zero at either end of a single transformer because both the primary and secondary in the new converter configurations disclosed herein are excited by stiff switching waveforms $v_s$ and $av_s$, where $v_s$ and $av_s$ correspond to the respective switching waveform $V_{L1}$ and $V_{L2}$ of FIG. 7, and a is a constant. This results from the switching source $av_s$ for the secondary having been generated by the alternate energy transfer path through the storage capacitance $C_1$ (FIG. 8), as described with reference to FIGS. 5(1) and 5(2). By proper design of the transformer inductive coupling, balanced or unbalanced reduction of ripple currents may be achieved as in FIG. 8(1), FIG. 8(2) or FIG. 8(3).

Figure 8A:
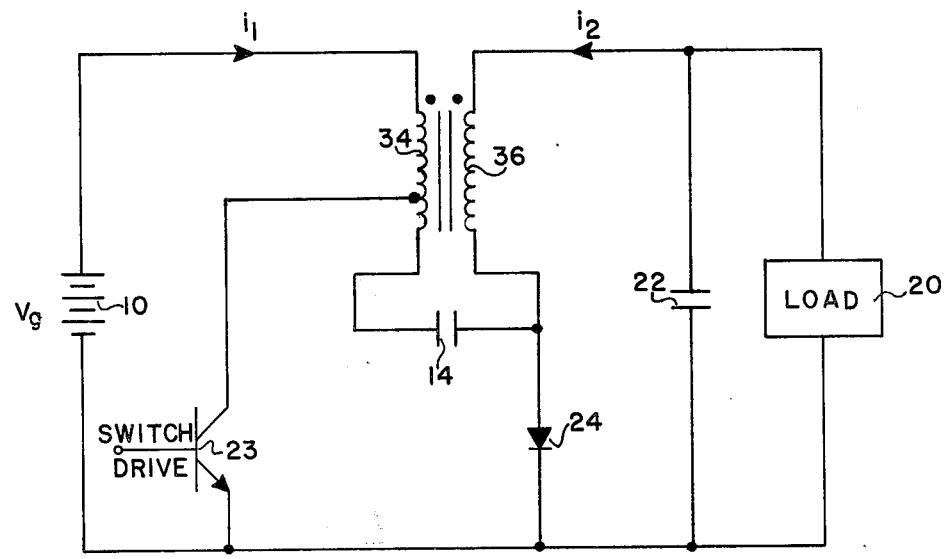
FIGS. 8a and 8b show variants of the circuit in FIG. 8.
Figure 8B:
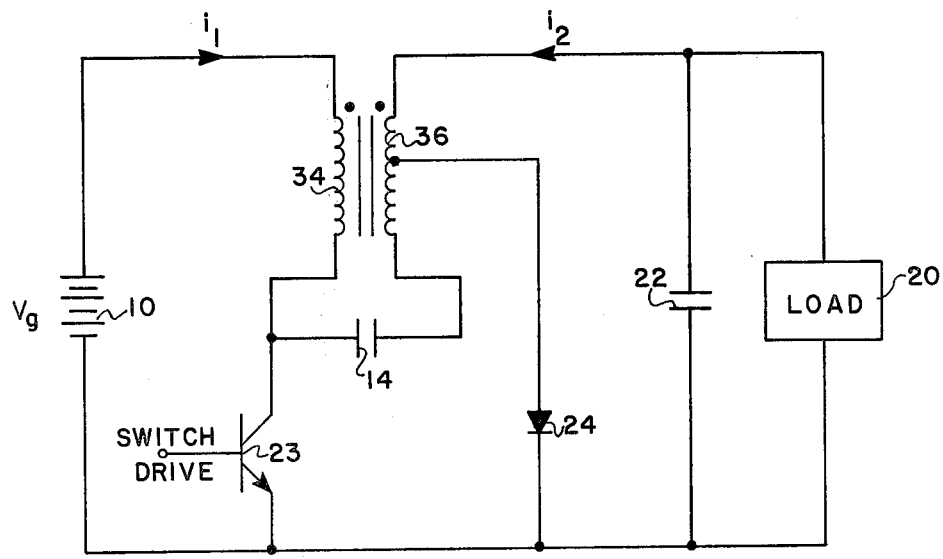

FIGS. 8a and 8b illustrate variants of the circuit of FIG. 8. The idealized switch is implemented by a transistor 23 and diode 24, as just suggested, but more important than that, the primary winding 34 is tapped in the variant of FIG. 8a to extend the step-up range of the input voltage. In FIG. 8b, the secondary winding is tapped to extend the stepdown range of the input voltage. This is analagous to the variants shown in FIGS. 5b and 5c to the embodiment shown in FIG. 5a.

Figure 9:
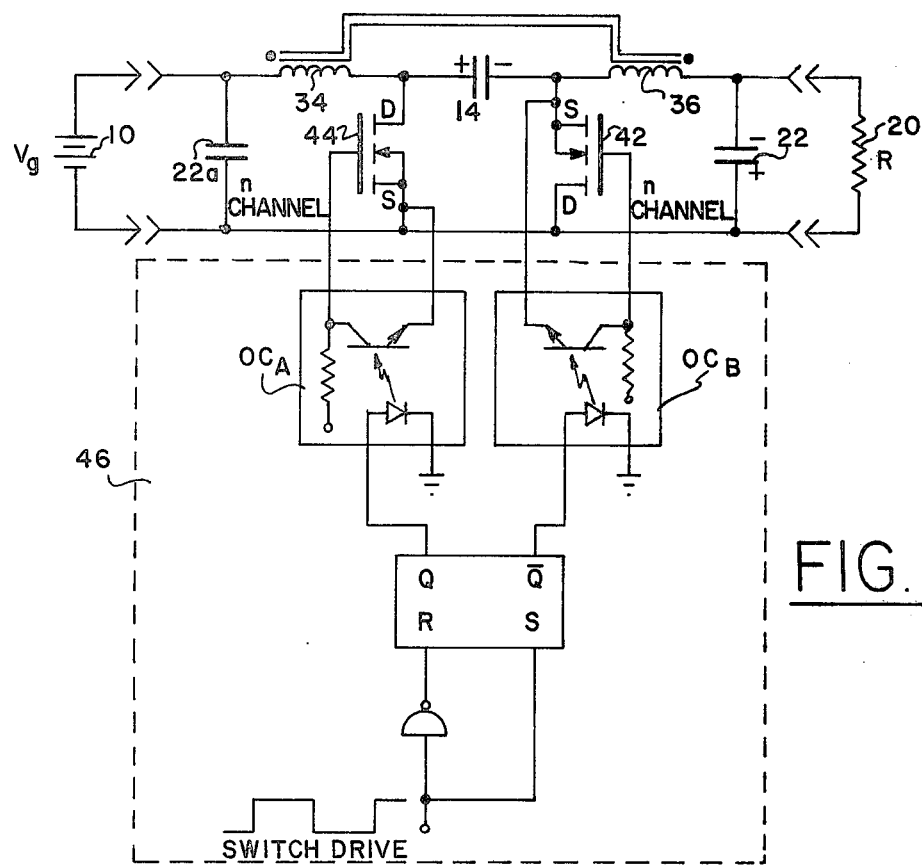
FIG. 9 is a circuit diagram of a variant of the invention shown in FIG. 5a using VMOS switching.

Realization of the switch 40 in FIG. 8 with a bi-polar transistor and diode is only one practical way of implementation. Recent technological advances in vertical metal oxide semiconductor (VMOS) power transistors now permit a true bi-directional realization of the switch 40, and allow full advantage to be taken of the complete symmetry, as shown in FIG. 9. Two n-channel VMOS transistors 42 and 44 replace the diode 24 and transistor 23, respectively, of FIG. 5a. They are alternately switched on and off by a switching signal source. Presently only n-channel VMOS transistors are commercially available. This then necessitates the replacement of the switching diode by a VMOS power transistor 42 as shown with its drain (D) grounded. As a consequence this requires an isolated voltage drive for that transistor since the potential of its source (S) is floating. However, the two out-of-phase isolated voltage drives for two VMOS transistors 42 and 44 can be easily achieved by use of optical couplers $OC_A$ and $OC_B$ in a switch drive processing scheme as shown in block 46. Another possibility is to use a signal processing transformer with two secondary windings to obtain isolated voltage drives.

The practical implication of the switch 40 (FIG. 8) realization by VMOS transistors is that now the same physical configuration of FIG. 9 can be used to obtain both negative and positive output voltage with respect to ground, depending upon whether source voltage and load are used as shown in FIG. 9 or in the interchanged position, with corresponding polarity change of source voltage when applied on the right side. Hence the same converter can serve as both a positive and a negative power supply, a feature not present in any other converter.

Figure 9A:
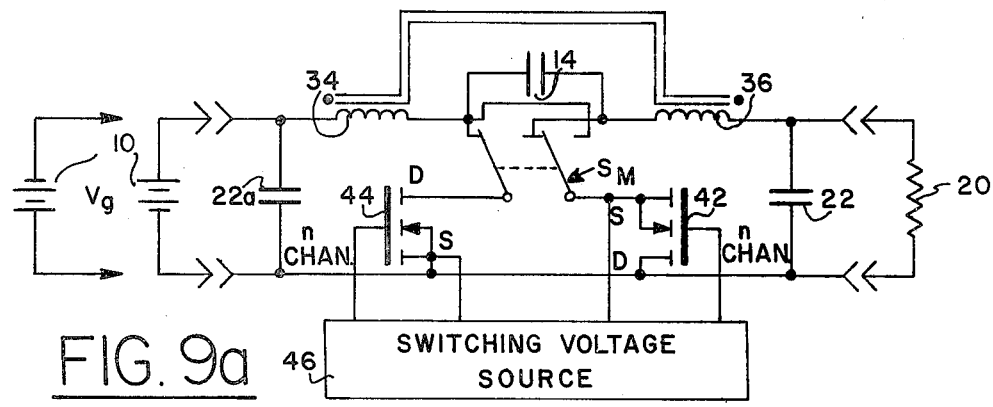
FIGS. 9a and 9b are variants of FIG. 9.

However, very often a switching converter is used as a part of a closed-loop switching regulator, in which interchange of the source voltage and load position would be inconvenient since the feedback signal is taken from a fixed output position. Nevertheless by adding a single manual switch $S_M$, as shown in FIG. 9a, this difficulty is circumvented. For the position of the switch shown, positive input voltage $+V_g$ is applied and negative output voltage obtained. However in the opposite position of the switch for cross-connection of the VMOS transistors, negative polarity input voltage $-V_g$ results in positive polarity output voltage, while the position of the load does not change. In either case voltage-regulating feedback may be provided. Hence both positive and negative regulated voltage power supplies are obtained with the single switching regulator configuration shown in FIG. 9a.

Figure 9B:
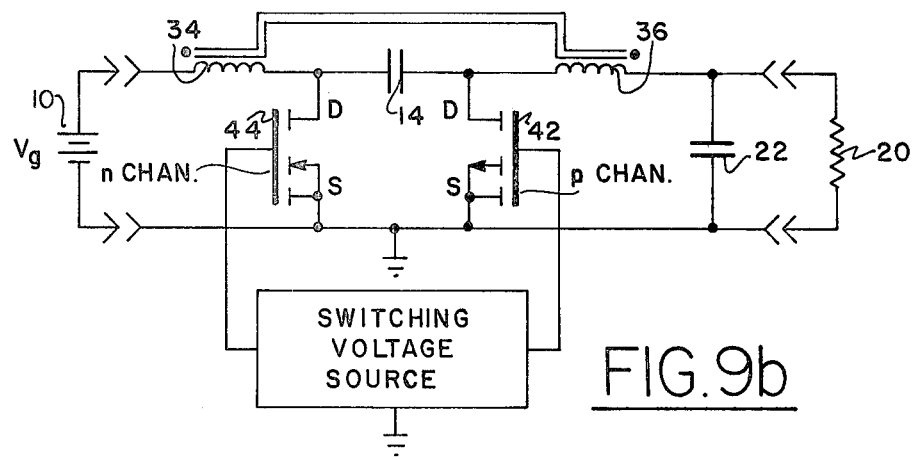

Note that both of the circuits shown in FIGS. 9 and 9a are equally applicable when the transformer is split into the two non-coupled inductances as shown in the preferred embodiment of FIG. 5. While the isolated voltage drives in FIG. 9 may seem quite complex, the expected availability of p-channel VMOS power transistors in the near future will significantly reduce the complexity of the drive circuitry as suggested in FIG. 9b, wherein both voltage drives are referred to ground and corresponding out-of-phase (non-overlapping) drives can be easily achieved by a conventional signal processing technique.

Referring back to FIG. 9 again, similar functioning components, as are shown in FIG. 8, receive the same reference numerals. For the purpose of complete symmetry, capacitance 22a is connected across the input voltage source 10. The input voltage source 10 and the load 20 may be interchanged, with the connections being made at the location shown with the polarity of the voltage source reversed when applied at the right side. In the case where the voltage source and the load are at the locations shown in FIG. 9, energy flow occurs from left to right. When they are interchanged, energy flow occurs from right to left.

Figure 10:
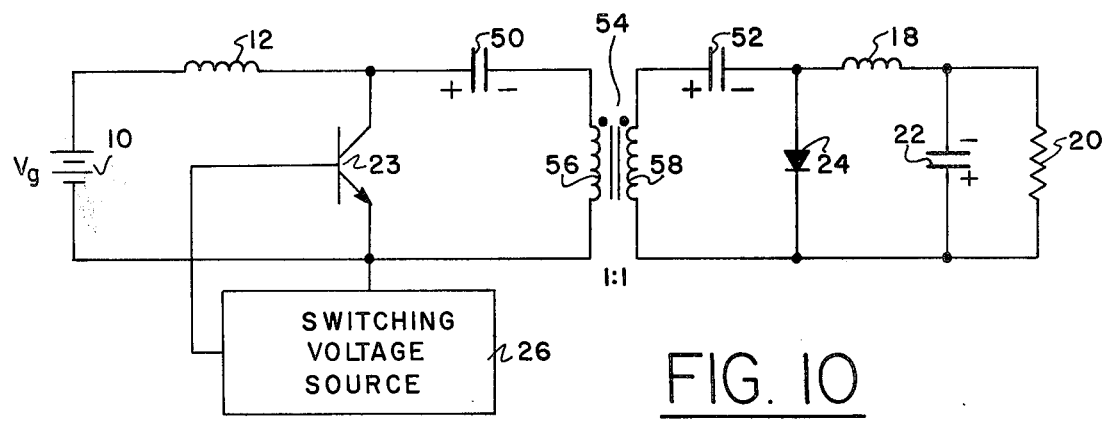
FIG. 10 is a circuit diagram of another embodiment of the invention in FIG. 5a which provides for DC isolation.

In many applications of dc-to-dc switching converters, it is necessary to incorporate DC isolation between the input and output circuits of the converter. This invention may be very simply modified to achieve this result and at the same time to provide a capability for multiple outputs with different polarities and magnitudes as shown in FIG. 10. There, a circuit diagram is shown of a modification of the embodiment of the invention shown in FIG. 5a which provides DC isolation between the input and output circuits of the converter. Those elements in FIG. 10 which perform the same function as in FIG. 5a are identified by the same reference numerals. The modification comprises using two capacitances 50 and 52 in place of the capacitance 14, and the insertion of a one-to-one transformer 54 where the primary 56 connects between the capacitance 50 and the voltage source 10 and the secondary 58 connects between the capacitance 52 and the load 20.

This circuit arrangement operates according to the same principles described in connection with FIG. 5. The sum of the voltages of the two capacitances 50 and 52 equals $V_g/D'$, and the individual capacitance voltages adjust to maintain balanced volt-seconds in the transformer 54. That is, there is automatic volt-second adjustment and there is no problem of operating point "creep" in the transformer.

When the transistor 23 is not conducting, capacitance 50 charges up through primary winding 56, inducing a voltage in secondary winding 58 which charges up capacitance 52. Diode 24 is conductive at this time. When the transistor 23 becomes conductive, capacitance 50 discharges through primary winding 54, inducing a voltage in secondary winding 58. The voltage across capacitance 52 and the voltage induced in the secondary winding have a polarity to be additive, and they in turn charge up inductance 18 and supply current to the load.

When transistor 23 next becomes non-conductive, capacitance 50 charges up from the voltage source 10 causing current flow through primary winding 56 and inducing a voltage across secondary winding 58 which charges capacitance 52 up again. At the same time, inductance 18 discharges through the load 20, maintaining a nonpulsating output current. The capacitance 22 connected in parallel with the load filters the ripple in the output current.

While FIG. 10 shows a converter, using a transformer having a one-to-one conversion ratio, there is no reason why the converter may not have a transformer with a 1:N turns ratio with relative polarity such that the output DC voltage is positive instead of negative, and is scaled by a factor N compared with its value in the original non-isolated converter.

Figure 11:
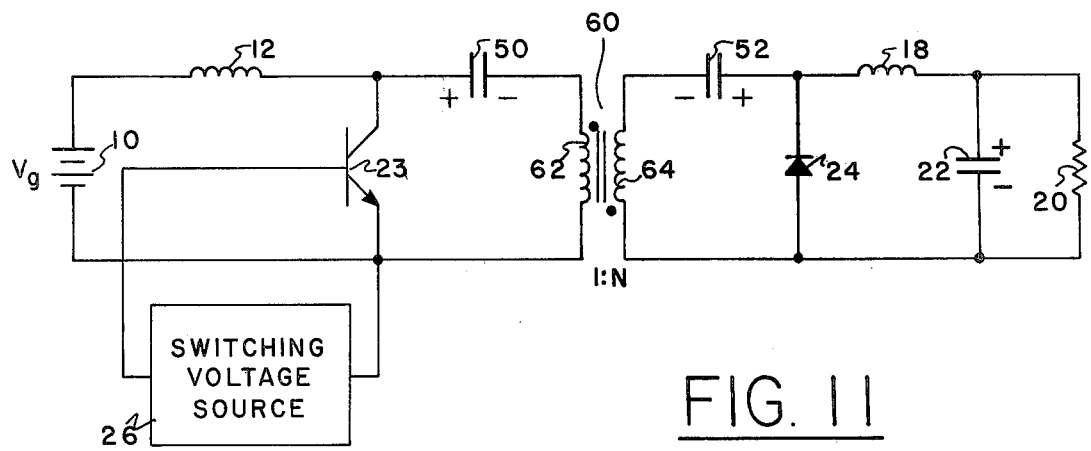
FIG. 11 is a circuit diagram of a variant of the circuit of FIG. 10.

FIG. 11 is a schematic diagram of an embodiment of the invention wherein the isolation transformer 54, which previously had a one-to-one ratio of primary and secondary windings is replaced by a transformer 60, having a primary winding 62 and a secondary winding 64 wherein the ratio of these windings is 1:N and the relative polarity of these windings is reversed, as contrasted to the relative polarity of the windings of the transformer 54 shown in FIG. 10, as represented by the dots adjacent to these windings. The components of the circuit arrangement shown in FIG. 11, which perform the same functions as those shown in FIG. 10, have the same reference numerals applied thereto. FIG. 11 provides an increased voltage output over the arrangement shown in FIG. 10 and a positive input and positive output voltage as well.

Figure 12:
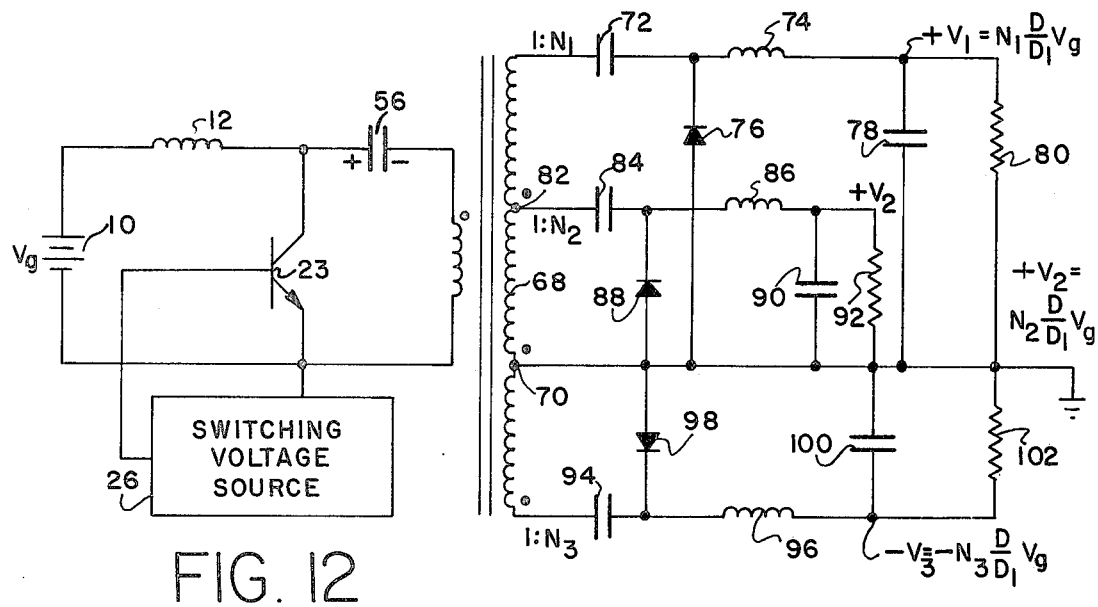
FIG. 12 is a circuit diagram of an embodiment of this invention having multiple outputs.

FIG. 12 is a schematic diagram of a converter in accordance with this invention having multiple outputs of various scaling ratios $N_1$, $N_2$, etc. The secondary winding 68 has a tap at a location 70. To obtain the voltage ratio 1:$N_1$, a capacitance 72 provides a function analogous to that of capacitance 52 in FIG. 10. An inductance 74 produces a function analogous to that of inductance 18. Diode 76 is connected between the tap 70 and the junction between capacitance 72 and inductance 74 and performs a function analogous to diode 24. Capacitance 78 is connected across the load 80 and performs the function analogous to the one performed by capacitance 22.

Similarly, to obtain the voltage ratio 1:$N_2$, connection is made to a tapping point 82. The circuit is the same as described, including the capacitance 84 connected in series with an inductance 86. A diode 88 connects the junction of capacitance 84 and inductance 86 to the tapping point 70. A capacitance 90 is connected across the load 92.

To obtain the voltage ratio 1:$N_3$, capacitance 94 is connected in series with inductance 96. Diode 98 is connected between the junction of the capacitance and the inductance to the tap off point 70. Capacitance 100 is connected across the load 102.

Figure 13:
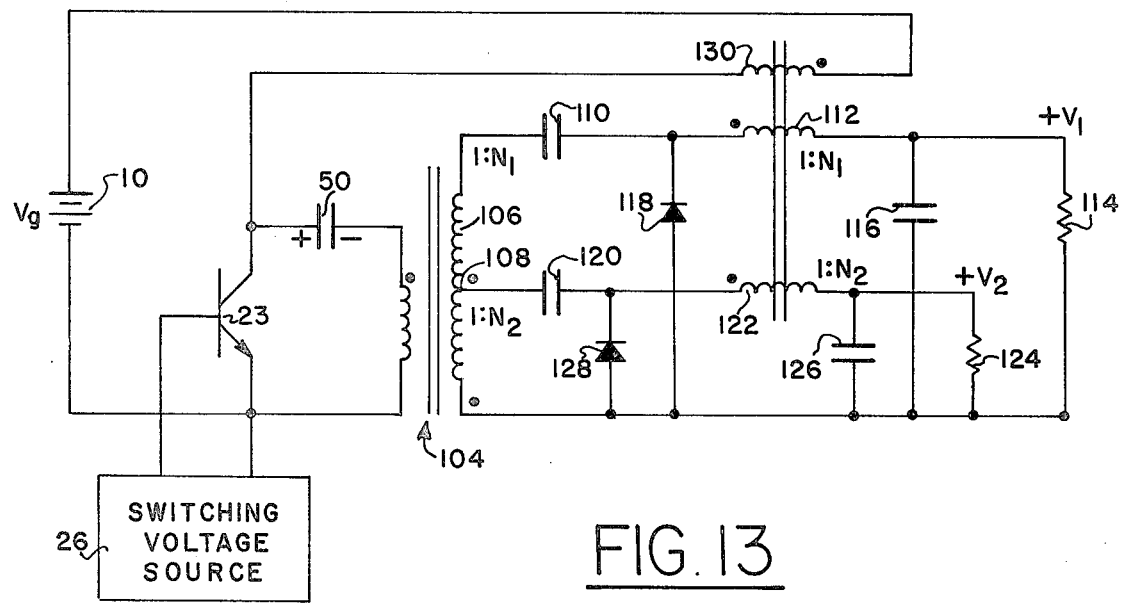
FIG. 13 is a circuit diagram of an embodiment of the invention having multiple outputs with isolation and coupled inductors.

FIG. 13 shows an embodiment of the invention wherein isolation between input and output is provided as well as coupling of both output inductances back to the input inductance. The isolation is achieved using transformer 104, wherein the secondary winding 106 has a tap at a point 108, to provide two ratios 1:$N_1$ and 1:$N_2$. There is a capacitance 110 connected in series with an inductance 112. A load 114 is connected to receive the output of the entire secondary winding 106 and a capacitance 116 is connected across the load. A diode 118 is connected between the junction of capacitance 110 and inductance 112, and the load.

For the second output, capacitance 120 is connected in series with an inductance 122. Inductance 122 is connected to the other end of the winding 106 through a load 124. Capacitance 126 is connected across the load and diode 128 is connected between junction of capacitance 120 and inductance 122 and the other side of the load. The distinction between the circuit arrangement shown in FIG. 13 from the one shown in FIG. 12 is that the input inductance 130 is coupled to the respective output inductances 112 and 122. For maximum ripple reduction and minimum size and weight, the inductance coupling ratio should be the same as the respective isolation transformer ratios for each output; however, benefits intermediate between the non-coupled inductances and equal ratio-coupled inductances can be obtained by use of unequal ratios.

Note that in the isolated switching converters of FIG. 10 and FIG. 11, the bipolar transistor and diode combination can again be substituted by the combination of two VMOS power transistors as previously shown in FIG. 9. However, to preserve the isolation property of the converter the isolated voltage drives of FIG. 9 should be implemented. Hence, the single configuration can be used (with addition of manual switch $S_M$) to obtain both positive and negative, isolated, regulated output voltages.

Figure 14:
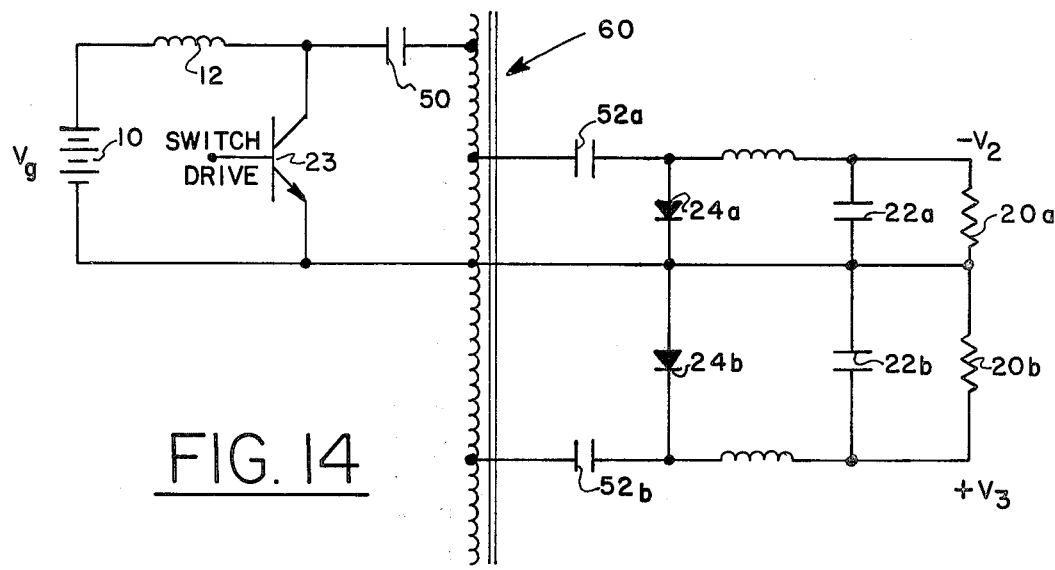
FIG. 14 illustrates a variant of the circuit of FIG. 10 where the isolation transformer is replaced by an autotransformer with multiple output taps.

Note also that if the multiple output feature is desired without the need for the isolation, a simple modification of the basic isolated version of FIG. 10 can be made. Namely, by use of an autotransformer 60 with several secondaries (tap-off points) instead of the isolation transformer in FIG. 10, the converter of FIG. 14 is obtained. The advantage of using the configuration of FIG. 14 is the same as that coming from replacement of an isolation transformer by an autotransformer, namely, the reduction in the size and weight of the transformer since the same winding is part of both primary and secondary windings. However, the isolation property is lost.

Figure 15:
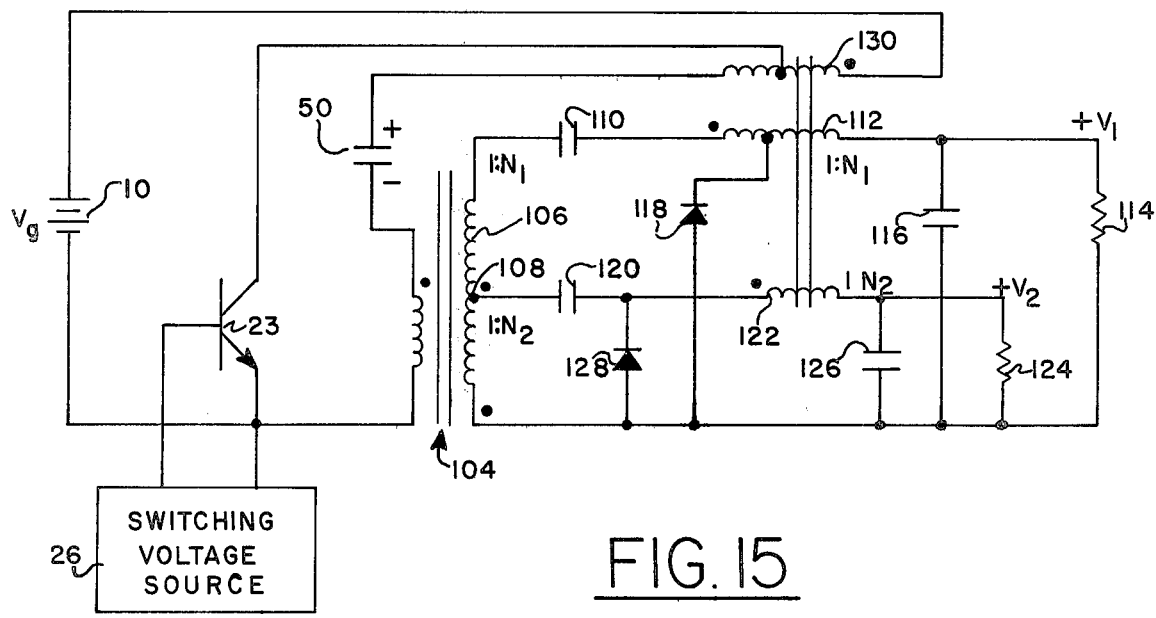
FIG. 15 illustrates a variant of the circuit of FIG. 13.

FIG. 15 illustrates another variation of a dc-to-dc converter with an isolation transformer as in FIG. 13 and coupling of both output inductances back to the input inductance, as in FIG. 13 with tapping of the input and/or output inductances for extension of step-up and/or step-down voltage ranges as in FIGS. 5b and 5c. Here the input inductance winding 130 is tapped for extended step-up range and one output inductor winding is tapped for an extended step-down range. While such an arrangement of both step-up and step-down range extensions in a single converter of a multi-converter circuit is not likely to be required for any application, it does serve to illustrate tapping the coupled input and/or output inductances in a multi-converter configuration.

The new converter topology described with reference to FIG. 5, and its various extensions and modifications have been experimentally verified, and an extensive comparison, both theoretical and experimental, has been made between them and the prior art described with reference to FIGS. 1–4. The significant advantages of higher efficiency, smaller size and weight, and significantly reduced switching ripple are realized in addition to a number of other advantages. A discussion of the highlights of these comparisons and advantages follows.

First, a comparison between the new converter of FIG. 5 and the conventional buck-boost converter to which an input filter is added (FIG. 1) is made. As seen in FIGS. 1 and 5, both converters consist of the same components, but differ in the way these components are interconnected. The two experimental test circuits for the converters of FIG. 1 and FIG. 5a have been built with the following element values:

$L_1=6.5$ mH, $L_2=3.5$ mH, $C_1=100$ $\mu$F, $C_2=0.47$ $\mu$F, $R=75\Omega$

Tests which have been made show that this invention (FIG. 5) provides not only a larger DC gain, but also significantly higher efficiency throughout the duty ratio D range. For example, for the typical application, where the input voltage is $V_g=5$ V and the output voltage kept constant at $V=15$ V by closed-loop regulation, the converter, in accordance with this invention, would operate at 93.5% efficiency while the converter of prior art operates at only 65.5% efficiency. This difference is actually even bigger since, for the same conditions, the transistor and diode DC losses would be about 30% higher in the conventional circuit. Similarly, transistor switching losses would be significantly higher, further degrading the efficiency of the conventional circuit. Finally, the output current of the conventional circuit is pulsating, causing significant power loss in the ESR (equivalent series resistance) of the output capacitor, especially at higher load current, which is not the case for the converter constructed in accordance with this invention. When the switching ripple was compared for the two converters, it was substantially reduced by the new converter. In fact, there was a 30:1 ripple reduction. Weight and size reduction are also achieved owing to the significant energy-transferring capabilities per unit size and weight of the capacitive storage in energy transferring (commutating) capacitance $C_1$. Thus, when $C_1$ was reduced 1000 times, to $C_1=0.1$ $\mu$F the output switching ripple remained virtually unchanged. Also note that the element values chosen are such as to show only moderately the advantages of this invention, since at higher load current they are even more pronounced.

In yet another comparison, the conventional converter of FIG. 1 required special floating drive circuitry to drive its power transistor $Q_1$, while there was no such requirement in the new converter whose power transistor is referred to ground.

It is now appropriate to compare the coupled inductor extension of the new converter (FIG. 8) with a simple transformer-coupled version (FIG. 2) of the conventional buck-boost converter in FIG. 1. As seen in FIGS. 2 and 8, both converters consist of the same components: a single transformer, capacitance $C_1$ (capacitance $C_2$ is not essential for the proper operation of the new converter in FIG. 8), and a single switch realized by the bipolar transistor-and-diode combination. However, while both converters have the simplest possible structure, the new converter of FIG. 8 has several important advantages. For example, the "flyback" converter of FIG. 2 has both the output and the input current pulsating, with resulting very poor ripple performance. By contrast, the coupled-inductor extension (FIG. 8) has switching current and voltage ripples substantially reduced (by an order of magnitude as shown in FIG. 8(1)) over the already small ripple in the basic embodiment of FIG. 5, and current ripple may be reduced to zero at either the input or output by proper design of the inductive coupling between the inductors, as shown in FIGS. 8(3) and 8(2), respectively. The direct consequence of its nonpulsating output current is also the higher voltage gain and efficiency throughout the duty ratio variation as in the previous comparison. In addition, the transformer in the conventional "flyback" converter acts essentially as an inductor, since the energy is stored in the primary during one part of the switching cycle, and delivered to the output through the secondary during the other part of the cycle. In the transformer of the new converter of FIG. 8, however, the two windings function simply as the two separate original inductors for the DC current and as an AC transformer for ripple and other AC considerations. An obvious saving in both size and weight also results by placing the two inductor windings of the original converter of FIG. 5 on the same core.

In still another comparison with the straight-forward cascade connection of the conventional boost converter followed by the buck converter (FIG. 3), the reduced number of transistors and diodes in the new converter of FIG. 5 (one transistor and diode less), translates into lower DC and switching losses, hence higher efficiency, in addition to the decreased circuit complexity. Also, the transistor removed in its realization is the one requiring floating drive. Moreover, while the isolation and multiple output feature can be easily incorporated in the new converter, as shown in FIG. 10, by addition of a single transformer, this is not possible in the prior-art converter of FIG. 3. However, the coupling of the inductors may still be implemented with the resulting ripple reduction benefits.

Figure 4:
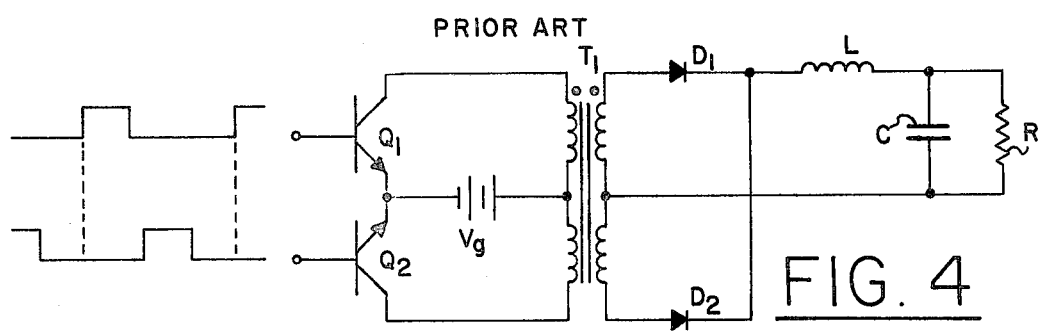
FIG. 4 is a schematic diagram of a conventional push-pull switching dc-to-dc converter.

Finally, let us compare the isolated version of the new converter (FIG. 10) with the usual way of achieving the isolation in the buck converter by use of a push-pull configuration (FIG. 4). As seen in FIG. 4, that realization requires two switches and associated drives, and there is a problem of "creep" of the transformer core operating point because of imbalances in the push-pull symmetry. In contrast, the new converter of FIG. 10 achieves the same results with a single switch, and with a "single-ended" transformer in which automatic volt-second balance is obtained by self-adjustment of the voltages on the capacitors 50 and 52; there is no DC path in any winding.

In summary, a novel dc-to-dc converter is developed which offers higher efficiency, lower output voltage ripple, reduced EMI, smaller size, and yet at the same time achieves the general conversion function: it is capable of both increasing or decreasing the input voltage depending on the duty ratio of the transistor switch. This converter employs a new circuit topology which enables it to have both input and output current nonpulsating. The converter uses capacitive energy transfer rather than the inductive energy transfer employed in the prior art.

Some of the important advantages of the new converter over the other existing converters are:
1. Provides true general (increase or decrease) DC level conversion of both DC voltage and current.
2. Offers much higher efficiency.
3. Both output voltage and current ripple are much smaller.
4. No dissipation problems in the ESR of the output capacitance.
5. Substantial weight and size reduction due to smaller output filter and smaller energy transferring device (capacitance $C_1$).
6. Electromagnetic interference (EMI) problems are substantially reduced, thanks to the small ac input current ripple, without need for additional input filters.
7. Excellent dynamic response enables simple compensation in a switching regulator implementation.
8. Much siompleer transistor drive circuitry, since the switching transistor is referenced to ground (grounded emitter).

In addition to these advantages, the unique topology of the new switching converter allows some important extensions to be made which are otherwise not achievable in conventional switching converter structures. The additional benefits are:
1. Coupling of the inductances in the new converter further substantially reduces both input and output current ripple as well as output voltage switching ripple.
2. Implementation of the ideal switch S in FIG. 9a by two VMOS power transistors allows the same converter to achieve a dual function, and to serve as both a positive or a negative regulated voltage supply.
3. Insertion of a single transformer in the structure of the new converter (FIG. 10) results in the highly desirable isolation property, together with multiple inverted or noninverted output capability.

Thus, the new switching dc-to-dc converter is superior to any of the currently known converters in its category, outperforming them in every respect.

Accordingly, there have been described and shown herein novel and useful circuit arrangements for dc-to-dc converters. Although only a limited number of particular embodiments have been illustrated and described, it is recognized that modifications and variations may readily occur to those skilled in the art. Consequently, it is intended that the claims be interpreted to cover such modifications and variations.

What is claimed is:

1. A dc-to-dc converter having both input and output current nonpulsating for applying an input voltage from a source to a load, said converter being comprised of:
   an input inductance,
   storage capacitance,
   an output inductance,
   means connecting said input voltage source, said input inductance, said storage capacitance, said output inductance, and said load in series to form a series circuit, said series circuit having a junction between said input inductance and said storage capacitance, and a junction between said storage capacitance and said output inductance, and
   switching means for alternately connecting the junction between said input inductance and said storage capacitance, and the junction between said storage capacitance and said output inductance, to return current paths for said source and load, whereby an improved dc-to-dc converter is provided which has optimum topolopy and superior performance properties.

2. A dc-to-dc converter as defined in claim 1 wherein said input inductance is a tapped inductor to form an autotransformer, and said switching means which previously connected the junction between said input inductance and said storage capacitance to the source return current path instead connects the inductor tap to the source return current path.

3. A dc-to-dc converter as defined in claim 1 wherein said output inductance is a tapped inductor to form an autotransformer, and said switching means which previously connected the junction between said output inductance and said storage capacitance to the load return current path instead connects the inductor tap to the load return current path.

4. A dc-to-dc converter as defined in claim 1 wherein said input and output inductances are respective first and second coupled inductors, whereby current ripples are reduced in at least one of two currents consisting of an input current through said first inductor and an output current through said second inductor.

5. A dc-to-dc converter as defined in claim 4 wherein said first and second inductors are coupled on a core to form a transformer designed for the condition $n=k$ for zero output current ripple, where k is the coupling coefficient and n is equal to the square root of the ratio of the self inductances $L_{11}$ and $L_{22}$ of said first and second inductors, respectively.

6. A dc-to-dc converter as defined by claim 4 wherein said first and second inductors are coupled on a core to form a transformer designed for the condition $n=1/k$ for zero input current ripple where k is the coupling coefficient and n is equal to the square root of the ratio of the self inductances $L_{11}$ and $L_{22}$ of said first and second inductors, respectively.

7. A dc-to-dc converter as defined in claim 4 wherein said first inductor is tapped to form an autotransformer, and said switching means which previously connected the junction between said first inductor and said storage capacitance to the source return current path instead connects the inductor tap to the source return current path.

8. A dc-to-dc converter as defined in claim 4 wherein said second inductor is tapped to form an autotransformer, and said switching means which previously connected the junction between said second inductor and said storage capacitance to the load return current path instead connects the inductor tap to the load return current path.

9. A dc-to-dc converter as defined in claim 1 wherein said switching means is comprised of a first semiconductor switch connecting the junction between said input inductance and said storage capacitance to said return current path for said source, and a second semiconductor switch connecting the junction between said output inductance and said storage capacitance to said return current path for said load, and means for alternately turning said switches on.

10. A dc-to-dc converter as defined in claim 9 wherein said first semiconductor switch is a bipolar power transistor and said second semiconductor switch is a diode.

11. A dc-to-dc converter as defined in claim 9, wherein said switches are VMOS power transistors in an arrangement in which complete symmetry and bidirectional energy flow are preserved.

12. A dc-to-dc converter as defined in claim 1 wherein said storage capacitance is divided into two capacitances, and said means for connecting in series said input voltage source, said input inductance, said two capacitances, said output inductance, and said load is comprised of an isolation transformer having a primary winding connected between one capacitance and said return current path for said source and having a secondary winding connected between the other capacitance and said return current path for said load.

13. A dc-to-dc converter as defined in claim 12 wherein said input and output inductances are comprised of first and second inductors coupled to reduce ripple in at least one of said input and output currents.

14. A dc-to-dc converter as defined in claim 12, and including at least one additional load, said isolation transformer having an additional secondary winding for the additional load and a separate storage capacitance and inductance in series coupling the additional secondary winding of said transformer to the additional load, and said switching means includes means for alternately connecting the junction between said separate inductance and storage capacitance to a return current path for said additional load.

15. A dc-to-dc converter as defined in claim 12 wherein said input and output inductances are comprised of an input inductor and a plurality of output inductors for a plurality of loads, and said input inductor is coupled to said plurality of output inductors to reduce ripple in at least one of said input and output currents.

16. A dc-to-dc converter as defined in claim 15 wherein said input inductor is tapped to form an autotransformer, and said switching means which previously connected the junction between said input inductance and said storage capacitance to the source return current path instead connects the inductor tap to the source return current path.

17. A dc-to-dc converter as defined in claim 15 wherein one of said output inductors is tapped to form an autotransformer, and said switching means which previously connected the junction between said output indutance and said storage capacitance to the load return current path instead connects the inductor tap to the load return current path.

18. A dc-to-dc converter as defined in claim 1 wherein said storage capacitance is divided into two capacitances and including an autotransformer having a plurality of taps, one connected to one of said two capacitances, one connected to the other of said two capacitances, one connected to said return current path for said source, and one connected to said return current path from said load, the taps for said storage capacitances and said return current paths being distinct.

19. A dc-to-dc converter as defined in claim 18, and including at least one additional load, said autotransformer having an additional tap for connection to a return current path for said additional load and a separate storage capacitance and inductance in series coupling a tap of said autotransformer to said load, and said switching means includes means for alternately connecting the junction between said separate inductance and storage capacitance to a return current path for said additional load.

20. A high efficiency dc-to-dc converter between a source of dc voltage and a load, said converter using two inductances, one in series with said source, the other in series with said load, and to obtain a dc level conversion, an energy storage capacitance and switching means for alternately connecting said storage capacitance between the source inductance and source return current path while simultaneously connecting the load inductance to the load return current path, and connecting said storage capacitance between the load inductance and the load return current path while simultaneously connecting the source inductance to the source return current path, whereby nonpulsating input and output current is provided.

21. A high efficiency dc-to-dc converter between a source of dc voltage and a load, said converter using two inductances, one a tapped inductor in series with said source, the other an inductor in series with said load, and to obtain a dc level conversion, an energy storage capacitance and switching means for alternately connecting said storage capacitance between the one inductor and source return current path while simultaneously connecting the other inductor to the load return current path, and connecting said storage capacitance between the other inductor and the load return current path while simultaneously connecting the tap of said one inductor to the source return current path.

22. A high efficiency dc-to-dc converter as defined in claim 21 wherein said two inductances are comprised of first and second coupled inductors, whereby current ripples are reduced in at least one of said input and output currents.

23. A high efficiency dc-to-dc converter between a source of dc voltage and a load, said converter using two inductances, one an inductor in series with said source, the other a tapped inductor in series with said load, and to obtain a dc level conversion, an energy storage capacitance and switching means for alternately connecting said storage capacitance between the one inductor and source return current path while simultaneously connecting the tap of the other inductor to the load return current path, and connecting said capacitance between the other inductor and the load return current path while simultaneously connecting said one inductor to the source return current path.

24. A high efficiency dc-to-dc converter as defined in claim 23 wherein said two inductances are comprised of first and second coupled inductors, whereby current ripples are reduced in at least one of said input and output currents.

25. A high efficiency dc-to-dc converter as defined in claim 24 wherein said two inductors are coupled to form a transformer designed for the condition $n = k$ for zero output current ripple, where k is the coupling coefficient and n is equal to the square root of the ratio of the self inductances $L_{11}$ and $L_{22}$ of said first and second inductors, respectively.

26. A high efficiency dc-to-dc converter as defined in claim 24 wherein said two inductances are coupled to form a transformer designed for the condition $n = 1/k$ for zero input current ripple where k is the coupling coefficient and n is equal to the square root of the ratio of the self inductances $L_{11}$ and $L_{22}$ of said first and second inductors, respectively.

27. A high efficiency dc-to-dc converter coupling a source of DC voltage to a load, said converter being comprised of an isolation transformer having a primary winding, one end of which primary winding is connected in series sequence with a first storage capacitance and a first inductance to said source, and the other end of which primary winding is connected to the source return current path to form a primary series circuit, said primary series circuit having a junction between said first storage capacitance and said first inductance, and a secondary winding, one end of which secondary winding is connected in series sequence with a second storage capacitance and a second inductance to said load and the other end of which secondary winding is connected to the load return current path to form a secondary series circuit, said secondary series circuit having a junction between said second storage capacitance and said second inductance, and switching means for alternately connecting the junction between said first storage capacitance and said first inductance to said source return current path and connecting the junction between said second storage capacitance and said second inductance to said load return current path.

28. A high efficiency dc-to-dc converter as defined in claim 27 wherein said first inductance and said second inductance are inductively coupled, whereby current ripples are reduced in at least one of two currents consisting of input current through said first inductance and an output current through said second inductance.

29. A high efficiency dc-to-dc converter as defined in claim 27 including a plurality of loads and a plurality of secondary series circuits, wherein said second storage capacitance for each secondary series circuit is comprised of a separate storage capacitance and a separate load inductance, and including only one primary series circuit comprised of a capacitor common to all loads, said common capacitor being connected in series with one source inductance connected in series with said source, the separate storage capacitance for each load being connected in series with the separate load inductance for each load, and said transformer having a plurality of secondary windings, one secondary winding for each of said plurality of secondary series circuits.

30. A high efficiency dc-to-dc converter as defined in claim 28 wherein said first inductance connected in series with said source is a tapped inductor, and said switching means which previously connected the junction between said first inductance and said storage capacitance to the source return current path instead connects the inductor tap to the source return current path.

31. A high efficiency dc-to-dc converter as defined in claim 28 wherein said second inductance connected in series with said load is a tapped inductor, and said switching means which previously connected the junction between said second inductance and said storage capacitance to the load return current path instead connects the inductor tap to the load return current path.

32. A high efficiency dc-to-dc converter coupling a source of DC voltage to a plurality of loads, said converter being comprised of an autotransformer having a plurality of taps, two of which taps are selected for a primary winding, and pairs of which taps are selected for a plurality of secondary windings, one end of said primary winding being connected in series sequence with a first storage capacitance and a first inductance to said source and the other end of said primary winding being connected to the source return current path, said series circuit of the primary winding having a junction between said first storage capacitance and said first inductance, and one end of each secondary winding is connected in series sequence with a different storage capacitance and a different inductance to a different one of said loads and the other end of each secondary winding is connected to its load return current path, said series circuits of the secondary windings having junctions between said different storage capacitances and said different inductances, and switching means for alternately connecting the junction between said first storage capacitance and said first inductance to said source return current path and connecting the junctions between said different storage capacitances and said different inductances in unison to their load return current paths.

33. In a converter, a transformer of appropriate design having a first winding and second winding, each winding being excited by a separate and proportional pulsating voltage waveform, thereby to reduce ripple in the current into said first winding to zero, or to reduce ripple in the current into said second winding to zero, depending upon the matching conditions in the design of the transformer, said matching conditions being $n=ak$ for zero ripple in said second winding and $n=a/k$ for zero ripple in said first winding, where n is equal to positive $\sqrt{L_{11}/L_{22}}$, and $L_{11}$ and $L_{22}$ are self-inductances of the respective first and second windings, k is the coefficient of coupling between said first winding and said second winding, and a is a positive constant of proportionality greater than, less than or equal to unity.

* * * * *